US009475496B2

(12) United States Patent
Attard et al.

(10) Patent No.: US 9,475,496 B2
(45) Date of Patent: Oct. 25, 2016

(54) MODIFIED AUTONOMOUS VEHICLE SETTINGS

(71) Applicant: Ford Global Technologies, LLC, Dearborn, MI (US)

(72) Inventors: Christopher Attard, Ann Arbor, MI (US); Shane Elwart, Ypsilanti, MI (US); Jeff Allen Greenberg, Ann Arbor, MI (US); Rajit Johri, Ann Arbor, MI (US); Devinder Singh Kochhar, Ann Arbor, MI (US); Douglas Scott Rhode, Farmington Hills, MI (US); John Shutko, Ann Arbor, MI (US); Eric Hongtei Tseng, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 14/088,031

(22) Filed: Nov. 22, 2013

(65) Prior Publication Data

US 2015/0149023 A1    May 28, 2015

(51) Int. Cl.
*B60W 30/182*    (2012.01)
*B60W 50/10*    (2012.01)

(52) U.S. Cl.
CPC ............ *B60W 30/182* (2013.01); *B60W 50/10* (2013.01)

(58) Field of Classification Search
CPC .................. B60W 30/182; B60W 50/10
See application file for complete search history.

(56) References Cited

U.S. PATENT DOCUMENTS

| 6,225,890 | B1 * | 5/2001 | Murphy ................ B60R 25/012 307/10.5 |
| 6,975,923 | B2 | 12/2005 | Spriggs |
| 7,864,029 | B2 * | 1/2011 | Huang et al. .............. 340/426.1 |
| 8,660,734 | B2 * | 2/2014 | Zhu et al. ........................ 701/23 |
| 2008/0161986 | A1 | 7/2008 | Breed |
| 2008/0245598 | A1 * | 10/2008 | Gratz et al. ................... 180/287 |
| 2008/0303696 | A1 * | 12/2008 | Aso ........................ G08G 1/161 340/935 |
| 2011/0118927 | A1 | 5/2011 | Cima |
| 2014/0005859 | A1 * | 1/2014 | Baskin ............... G07C 9/00309 701/2 |

FOREIGN PATENT DOCUMENTS

| JP | 2011043884 | 3/2011 |
| WO | WO 2012173256 | 12/2012 |
| WO | WO 2013074843 | 5/2013 |

* cited by examiner

*Primary Examiner* — John Q Nguyen
*Assistant Examiner* — Alan Hutchinson
(74) *Attorney, Agent, or Firm* — Frank A. MacKenzie; Bejin Bieneman PLC

(57) ABSTRACT

A vehicle includes at least one autonomous driving sensor configured to monitor at least one condition while operating in an autonomous mode. The vehicle further includes a processing device configured to identify at least one occupant, select a profile associated with the occupant, and autonomously operate at least one subsystem according to the selected profile and the at least condition monitored by the at least one autonomous driving sensor.

19 Claims, 2 Drawing Sheets

MODIFIED AUTONOMOUS VEHICLE SETTINGS

BACKGROUND

Autonomous vehicles are becoming more sophisticated. As the level of sophistication increases, the amount of passenger interaction required by the autonomous vehicle decreases. Eventually, autonomous vehicles will require no passenger interaction beyond tasks such as selecting a destination, allowing all passengers to focus on non-driving-related tasks.

DETAILED DESCRIPTION

An exemplary vehicle includes at least one autonomous driving sensor configured to monitor at least one condition while operating in an autonomous mode. The vehicle further includes a processing device configured to identify at least one occupant, select a profile associated with the occupant, and autonomously operate at least one subsystem according to the selected profile and the at least condition monitored by the at least one autonomous driving sensor.

The system shown in the FIGS. may take many different forms and include multiple and/or alternate components and facilities. While an exemplary system is shown, the exemplary components illustrated are not intended to be limiting. Indeed, additional or alternative components and/or implementations may be used.

Figure 1:
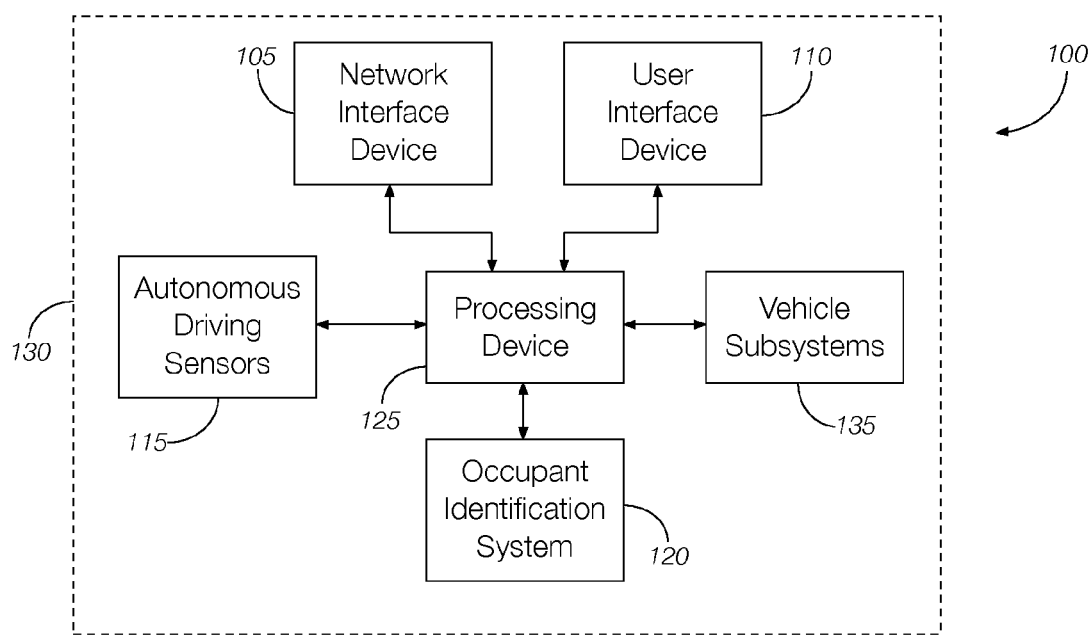
FIG. 1 illustrates an exemplary system for modifying autonomous vehicle settings.

As illustrated in FIG. 1, the system 100 includes a network interface device 105, a user interface device 110, at least one autonomous driving sensor 115, an occupant identification system 120, and a processing device 125. The system 100 may be implemented in a vehicle 130 such as any passenger or commercial car, truck, sport utility vehicle, taxi, bus, train, airplane, etc.

The network interface device 105 may be configured to facilitate communication over a telecommunication network such as a cellular network, a satellite network, or the like. The network interface device 105 may be further configured to communicate with mobile devices through, e.g., Bluetooth®, WiFi, or another communication protocol. Thus, the network interface device 105 may be configured to transmit messages to and/or receive messages from mobile devices.

The user interface device 110 may be configured to present information to a user, such as a driver, during operation of the vehicle 130. Moreover, the user interface device 110 may be configured to receive user inputs. Thus, the user interface device 110 may be located in the passenger compartment of the vehicle 130. In some possible approaches, the user interface device 110 may include a touch-sensitive display screen.

The autonomous driving sensors 115 may include any number of devices configured to generate signals that help navigate the vehicle 130 while the vehicle 130 is operating in an autonomous (e.g., driverless) mode. Examples of autonomous driving sensors 115 may include a radar sensor, a lidar sensor, a camera, an ultrasonic sensor, an energy-harvesting sensor, or the like. In some possible approaches, the autonomous driving sensors 115 may be configured to receive information from a remote source. Thus, the autonomous driving sensors 115 may further include cloud-based sensors such as a digital short range communication (DSRC) compliant device, a cellular receiver, a WiFi receiver, or the like.

The autonomous driving sensors 115 help the vehicle 130 "see" the roadway and the vehicle 130 surroundings and/or negotiate various obstacles while the vehicle 130 is operating in the autonomous mode. Moreover, the autonomous driving sensors 115 may be configured to monitor one or more conditions while the vehicle 130 is operating in autonomous or non-autonomous driving modes. Examples of conditions may include a roadway condition, an environmental condition, a traffic condition, or any combination of these and/or other types of conditions. Examples of roadway conditions may include a radius of road curvature, a road type, the number of lanes, the direction of traffic, the road grade, the type of lane, whether the road has a shoulder and if so the type of shoulder and the shoulder conditions, road speeds and regulations, intersection position, whether the intersection includes a control device, segment configuration, etc. Examples of environmental conditions may include the date, whether the current day is a weekend or holiday, the time of day, the current or pending lighting level, weather conditions (e.g., rain, snow, fog, mist, sleet, ice, or the like), etc. Examples of traffic conditions may include adjacent traffic proximity relative to the host vehicle 130, adjacent traffic classifications (e.g., whether adjacent traffic includes cars, trucks, pedestrians, motorcycles, etc.), adjacent traffic density and congestion levels, adjacent traffic speeds and acceleration information, etc.

The occupant identification system 120 may be configured to identify one or more occupants of the vehicle 130. In one possible approach, the occupant identification system 120 may be configured to receive a key and identify one or more occupants based on one or more signals received from the key. In addition or in the alternative, the occupant identification system 120 may be configured to identify one or more occupants from signals received from mobile devices located in or near the passenger compartment of the vehicle 130 or from images captured by, e.g., a camera located in the passenger compartment. The camera may be configured to capture still images or video of the occupants and, using image processing, identify one or more of the occupants.

In instances where multiple occupants are present, the occupant identification system 120 may be configured to identify one of the occupants as the "driver." For example, the person sitting in the drivers seat may be identified as the "driver." Alternatively, the "driver" may be identified according to a hierarchy. The vehicle owner may be assumed to be the "driver" any time the owner is present. If not present, the occupant identification system 120 may select a licensed family member of the owner as the "driver" before selecting licensed non-family members. The occupant identification system 120 may be configured to receive user inputs via the user interface device 110. Thus, a "driver" may be manually selected or the automatic selection of the "driver" may be manually corrected. The occupant identification system 120 may output an occupant identification signal representing the identity of one or more occupants.

The processing device 125 may be configured to control one or more subsystems 135 while the vehicle 130 is operating in the autonomous mode. Examples of subsystems 135 that may be controlled by the processing device 125 may include a brake subsystem, a suspension subsystem, a steering subsystem, and a powertrain subsystem. The processing device 125 may control any one or more of these subsystems 135 by outputting signals to control units associated with these subsystems 135. The processing device 125 may control the subsystems 135 based, at least in part, on signals generated by the autonomous driving sensors 115.

The processing device 125 may be further configured to receive the occupant identification signal output by the occupant identification system 120 and identify at least one occupant based on, e.g., the signal or signals received. With the occupants identified, the processing device 125 may select a profile associated with one the identified occupant, such as the occupant identified as the "driver." The processing device 125 may autonomously operate at least one subsystem according to the selected profile and in accordance with the conditions monitored by the autonomous driving sensor 115.

The selected profile may indicate whether the "driver" is a licensed driver as well as define one or more driving restrictions, if any, that limit the autonomous and/or non-autonomous operation of the vehicle 130. The profile associated with the owner of the vehicle 130 may not define any driving restrictions while the profile associated with an employee or a child of the owner may define multiple driving restrictions, especially if the child is a newly licensed driver. Examples of driving restrictions may include geographic restrictions, road type restrictions, timing restrictions, speed restrictions, safety restrictions, and environmental restrictions.

Geographic restrictions may limit the autonomous and/or non-autonomous operation of the vehicle 130 to particular routes and destinations. For instance, the geographic restrictions may define particular lanes (e.g., center, left of center, right of center, etc.) that the vehicle 130 may travel in for particular roads. The processing device 125 may temporarily override one or more geographic restrictions such as if there is an obstruction blocking the present lane of travel and the only way to avoid the obstacle is to move to a restricted lane. Another temporary override may occur if the vehicle 130 must travel in a particular lane to turn or exit from the current road. Other geographic restrictions may define particular destinations. Examples of destinations may include a place of employment or school. Other permissible destinations may be defined by one or more regions (e.g., a state, county, or other type of municipality) or a distance relative to a predetermined location (e.g., within 10 miles of the occupant's home or within a quarter of a mile for valet service). Moreover, other destinations may be selected by an owner to permit travel to, e.g., after school activities or to the home of one of the other occupants of the vehicle 130.

Road type restrictions may limit the autonomous and/or non-autonomous operation of the vehicle 130 to particular roads. For instance, the road type restrictions may prevent the vehicle 130 from travelling on highways so that the vehicle 130 may only travel on local roads. Another type of road restriction may include preventing the vehicle 130 from travelling to areas known to have high crime rates.

Timing restrictions may limit the autonomous and/or non-autonomous operation of the vehicle 130 to particular days or times. The timing restrictions, therefore, may limit use of the vehicle 130 by one or more occupants to weekdays, weekends, etc. Moreover, the timing restrictions may be used to enforce a curfew by requiring the vehicle 130 to return to a designated "home" location with the occupant by a particular time. The timing restrictions may be further used to prevent an occupant from using the vehicle 130 in low light conditions, which may be helpful if the occupant is a new driver or has a medical issue that makes driving at night difficult.

Speed restrictions may prevent the vehicle 130 from exceeding a predetermined speed relative to a posted speed limit and/or may define a maximum permissible vehicle speed. Other types of speed restrictions may limit the acceleration of the vehicle 130. Different acceleration limits may be defined for different types of road segments such as for straight road segments and curved road segments.

Safety restrictions may include various restrictions such as requiring the occupants to wear seatbelts any time the vehicle 130 is in motion, defining a maximum permissible volume for the entertainment system 100, limiting use of the user interface device 110 while the vehicle 130 is in motion, restricting media content from playing in the vehicle 130 under certain circumstances, limiting Internet usage, preventing the usage of mobile devices while the vehicle 130 is in motion, or the like. One additional or alternative safety restriction may include defining a refueling limit that requires the vehicle 130 to refuel at particular locations and/or when the fuel tank reaches a certain predetermined minimum level. The safety restrictions may automatically reroute the vehicle 130 to refuel or recharge as needed. The safety restrictions may further automatically fully or partially enable the autonomous mode if the vehicle 130 is being operated erratically. One way to partially enable the autonomous mode is for the safety restriction to define a minimum follow distance, correct the position of the vehicle 130 within a lane, and/or enable cruise control.

Environmental restrictions may limit the autonomous and/or non-autonomous operation of the vehicle 130 during particular weather conditions such as ice, fog, rain, snow, etc. Low visibility caused by the weather or, e.g., frosted windows, may further invoke one or more environmental restriction. In some instances, environmental restrictions may require that the vehicle 130 operate in the autonomous mode at least until the weather and/or visibility improve. In some other instances, environmental restrictions may require that the vehicle 130 not operate in the autonomous mode.

In some possible approaches, the processing device 125 may prevent the vehicle 130 from violating one or more of the restrictions. That is, the processing device 125 may enable the autonomous mode or control the route to autonomously operate the vehicle 130 in a manner that complies with the restrictions associated with the selected profile. In some instances, the processing device 125 may permit the vehicle 130 to violate one or more restrictions and transmit a message to the owner of the vehicle 130 describing the violation. Thus, the owner may be alerted any time a restriction is violated.

An override may automatically occur if, for instance, one of the occupants requires emergency services. During an emergency services override, the vehicle 130 may be permitted to autonomously or non-autonomously travel to a police department, a fire department, a hospital, a refueling station, or the like. In some instances, an emergency service provider, such as a 911 operator, may remotely override one or more driving restrictions that would otherwise prevent the vehicle 130 from allowing one or more occupants to seek emergency services.

In some instances, the occupant may wish to request that a restriction be temporarily disabled. Thus, the processing device 125 may be configured to receive, via the user interface device 110, a user input with a request for a particular restriction to be temporarily disabled. Using the network interface device 105, the processing device 125 may transmit an override request to the owner of the vehicle 130. The override request may be transmitted to the owner's cell phone or email address, for instance. The processing device 125 may receive a response from the owner's cell phone or email address that either permits or rejects the override request. If permitted, the processing device 125 may temporarily disable one or more of the driving restrictions. If the override request is rejected, the processing device 125 may output a message to the occupant via, e.g., the user interface device 110 indicating that the override request has been denied. The processing device 125 may control the operation of the vehicle 130 according to the driving restrictions associated with the selected profile. The owner may wish to grant the override request on a case-by-case basis as a reward or other incentive to the occupant.

In general, computing systems and/or devices, such as the network interface device 105, the user interface device 110, and the processing device 125, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
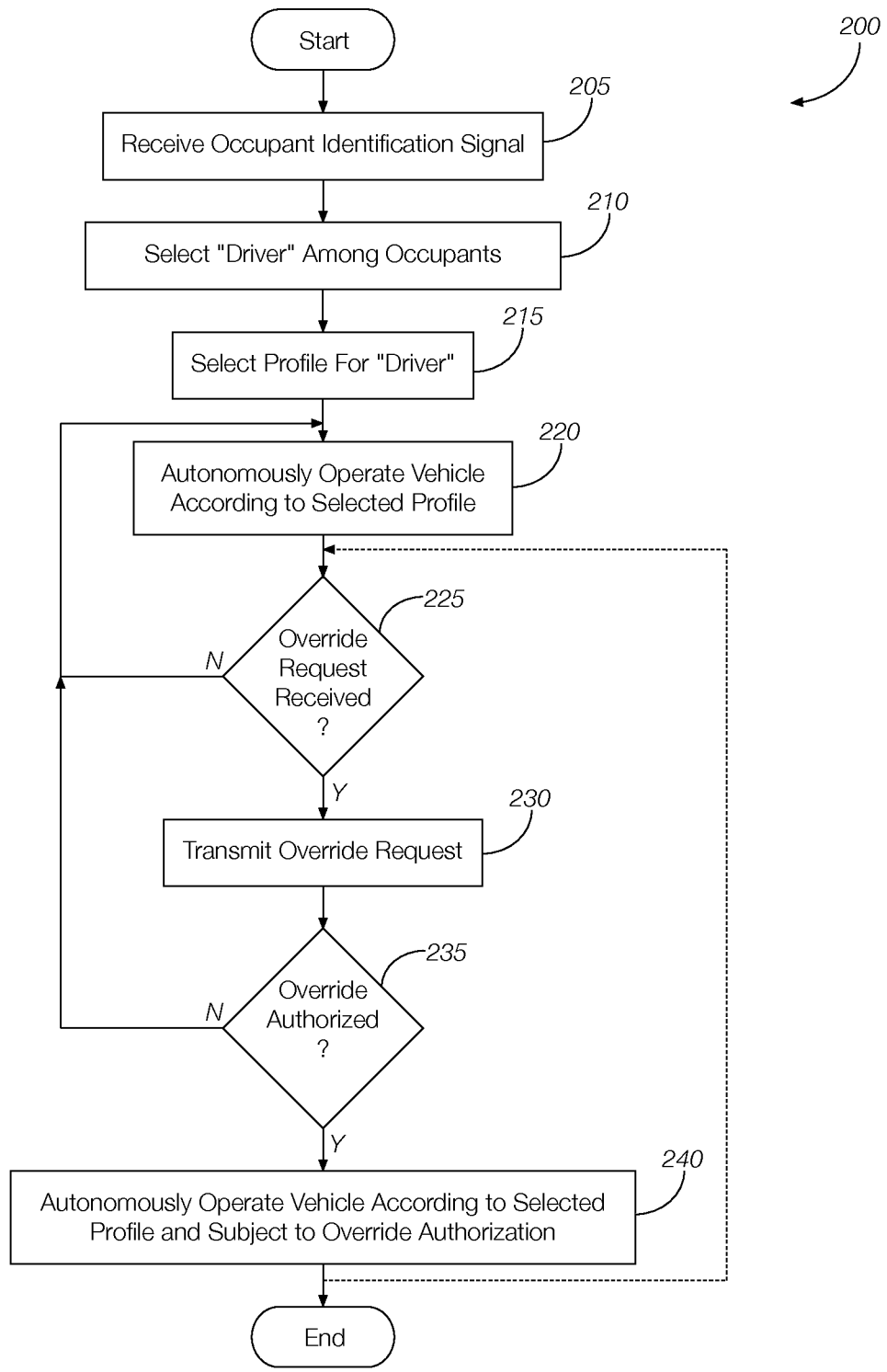
FIG. 2 illustrates a flowchart of an exemplary process that may be implemented by the system of FIG. 1 to modify autonomous vehicle settings.

FIG. 2 is a flowchart of a process 200 that may be implemented by one or more components of the system 100 of FIG. 1. For example, the process 200 may be executed by the processing device 125.

At block 205, the processing device 125 may receive the occupant identification signal from the occupant identification device. The occupant identification signal may represent one or more occupants based on information contained within a key and/or an image or video taken of one or more of the occupants.

At block 210, the processing device 125 may select the "driver" from among the occupants. The "driver" may be selected according to a hierarchy. The hierarchy may include the owner of the vehicle 130, licensed family members of the owner, licensed employees of the owner, unlicensed family members, and other unlicensed occupants.

At block 215, the processing device 125 may select the profile associated with the driver. The profile may be accessed from a memory device (not shown) and may define one or more driving restrictions. Examples of driving restrictions may include geographic restrictions, road type restrictions, timing restrictions, speed restrictions, safety restrictions, and environmental restrictions, as discussed above.

At block 220, the processing device 125 may autonomously or non-autonomously operate one or more vehicle subsystems 135 according to the driving restrictions defined by the selected profile. This may include limiting the autonomous and/or non-autonomous operation of the vehicle 130 to particular routes and destinations, to particular roads, to particular days or times, to particular speeds, to particular safety requirements, and/or to particular weather conditions and low visibility conditions.

At decision block 225, the processing device 125 may determine whether an override request has been received. The override request may be received as a user input made to, e.g., the user interface device 110 and may request an override of one or more driving restrictions defined by the selected profile. The override request may identify which driving restriction is to be temporarily disabled, and in some instances, may include a reason for temporarily disabling the driving restriction. In some instances, the override request may seek to temporarily disable all of the driving restrictions defined by the selected profile. If the override request is received, the process 200 may continue at block 230. If no override request has been received, the process 200 may return to block 220. If the override request is for emergency services, the processing device 125 may automatically permit the override request so that the vehicle 130 can travel to the nearest police department, fire department, hospital, or other emergency service provider.

At block 230, the processing device 125 may transmit the override request to the owner of the vehicle 130. The override request may be transmitted via any communication protocol supported by the network interface device 105. Therefore, the owner of the vehicle 130 may receive the override request as a message on his or her mobile device or as an email.

At decision block 235, the processing device 125 may determine whether the override is authorized. Whether the override is authorized may be based on whether an override authorization is received. The owner may grant or deny the override request by, e.g., sending a message from his or her mobile device or any other computing device configured to communication over a telecommunication network. The response may be received via the network interface device 105 and passed to the processing device 125. If the response includes an override authorization, the process may continue at block 240. If the response denies the override request, the process 200 may return to block 220. In some instances, the processing device 125 may display a message to the occupant who initiated the override request stating that the request has been denied. The message may further present one or more reasons for denying the request. In instances where no response is received, the processing device 125 may be configured to operate in accordance with a default response. The default response may automatically deny the request or automatically grant the request for a limited time. In some instances, the processing device 125 may send the override request to another individual authorized to grant approval of the override request.

At block 240, the processing device 125 may autonomously operate one or more of the vehicle subsystems 135 according to the selected profile but subject to the override authorization received. Thus, the override authorization need not temporarily disable all of the driving restrictions defined by the profile. The process 200 may end after block 240, although in some implementations the process 200 may return to block 225 so that another override request may be received and implemented if granted by the owner. Thus, the override may apply for a predetermined period of time or until a predetermined event, such as a key cycle, occurs.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
   at least one autonomous driving sensor configured to monitor at least one condition while operating in an autonomous mode;
   a processing device configured to identify at least one occupant, select a profile associated with the occupant, and autonomously operate at least one subsystem according to the selected profile and the at least one condition monitored by the at least one autonomous driving sensor,
   wherein the processing device is programmed to transmit an override request to temporarily disable a driving restriction associated with the profile of the occupant, and wherein the processing device is programmed to temporarily disable the driving restriction in response to receiving an override authorization and output a message to the at least one occupant if the override request is denied, and
   wherein the processing device is programmed to select a default response to the override request if the override authorization is not received within a predetermined period of time after transmitting the override request, wherein the default response includes temporarily approving the override request.

2. The vehicle of claim 1, wherein the processing device is configured to identify the at least one occupant based on an occupant identification signal.

3. The vehicle of claim 2, wherein the occupant identification signal is received from an occupant identification system configured to receive a key and identify an occupant based at least in part on the key.

4. The vehicle of claim 3, wherein the occupant identification system includes a camera configured to capture an image of at least one occupant.

5. The vehicle of claim 1, wherein the processing device is configured to identify multiple occupants and determine whether at least one of the occupants is licensed to operate the vehicle.

6. The vehicle of claim 1, wherein the driving restriction including at least one of a geographic restriction, a road type restriction, a timing restriction, a speed restriction, a safety restriction, and an environmental restriction.

7. The vehicle of claim 1, wherein the processing device is configured to receive a user input requesting at least a partial override of the driving restriction associated with the selected profile, and wherein the processing device is programmed to transmit the override request in response to the user input.

8. The vehicle of claim 7, further comprising a network interface device configured to transmit the override request to a vehicle owner.

9. The vehicle of claim 7, wherein the user input includes at least one of a vehicle owner override request and an emergency services override.

10. The vehicle of claim 1, wherein the message to the at least one occupant includes a reason for denying the override request.

11. The vehicle of claim 1, wherein the processing device is programmed to approve an emergency services override request without an override authorization.

12. The vehicle of claim 1, wherein the profile associated with the at least one occupant identifies a permitted lane and a restricted lane, and wherein the processing device is programmed to temporarily allow the vehicle to travel in the restricted lane if the at least one autonomous driving sensor detects an obstruction in the permitted lane.

13. A method comprising
identifying at least one vehicle occupant;
selecting a profile associated with the at least one vehicle occupant;
autonomously operating at least one vehicle subsystem according to the selected profile;
transmitting an override request to temporarily disable a driving restriction associated with the selected profile;
receiving, at a processing device, an override authorization to temporarily disable the driving restriction if the override request is authorized;
outputting a message to the at least one vehicle occupant if the override request is denied; and
selecting a default response to the override request if the override authorization is not received within a predetermined period of time after transmitting the override request, wherein the default response includes temporarily approving the override request.

14. The method of claim 13, wherein the at least one vehicle occupant is identified from an occupant identification signal.

15. The method of claim 13, wherein the driving restriction includes at least one of a geographic restriction, a road type restriction, a timing restriction, a speed restriction, a safety restriction, and an environmental restriction.

16. The method of claim 13, further comprising receiving a user input requesting the override request including at least a partial override of the driving restriction associated with the selected profile.

17. The method of claim 16, wherein the user input includes at least one of a vehicle owner override request and an emergency services override.

18. The method of claim 13, further comprising autonomously operating at least one vehicle subsystem according to the selected profile subject to the override authorization.

19. A vehicle comprising:
at least one autonomous driving sensor configured to monitor at least one condition while operating in an autonomous mode;
an occupant identification system configured to output an occupant identification signal representing at least one vehicle occupant;
a processing device configured to identify the at least one occupant based on the occupant identification signal, select a profile associated with the identified occupant, and autonomously operate at least one subsystem according to the selected profile and the at least one condition monitored by the at least one autonomous driving sensor;
wherein the selected profile defines at least one driving restriction and wherein the processing device is configured to receive a user input requesting an override of at least one of the driving restrictions and output a message to the at least one occupant if the override request is denied,
wherein the processing device is programmed to select a default response to the override request if the override authorization is not received within a predetermined period of time after transmitting the override request, wherein the default response includes temporarily approving the override request.

* * * * *